3,489,739
NOVEL CARBOALKOXYPHENYL ACRYLATES AND POLYMERS THEREOF
Hideyasu S. Yanai, Moorestown, N.J., and Warren H. Watanabe, Philadelphia, Pa., assignors to Rohm & Haas Company, Philadelphia, Pa., a corporation of Delaware
No Drawing. Filed Sept. 8, 1966, Ser. No. 577,802
Int. Cl. C08f 3/64
U.S. Cl. 260—89.5                                                13 Claims

ABSTRACT OF THE DISCLOSURE

Crystalline polymers may be produced at or above room temperature by free radical polymerization of o- or p-carboalkoxyphenyl acrylate, where the alkoxy group is methoxy or ethoxy. The polymers may be used for fibers, films, coatings, foams, etc. The monomers may alternatively be copolymerized, e.g., with p-cyanophenyl acrylate or p-carboethoxy acrylate, or they may be reacted with pre-formed polymers such as unsaturated polyesters of poly(methyl methacrylate).

---

This invention relates to novel monomers and to polymers and copolymers produced therefrom.

Since the pioneer work upon crystalline syndiotactic and isotactic polymers a vast amount of research has been carried out in laboratories throughout the world to find monomer systems which would yield crystalline tactic polymers (by "crystalline polymers," as used herein, is meant backbone crystallinity, not side chain crystallinity) at room temperature or above using simple free radical catalysts. So far as is known to us only one such system has been reported in the literature: J. W. L. Fordham, G. H. McCain and L. E. Alexander in the J. Poly. Sci. 39, 335 (1959) reported the successful preparation of a crystalline tactic polymer in this manner from vinyl trifluoroacetate.

Now we have discovered a group of novel monomers which polymerize to give crystalline tactic polymers at room temperature or above using simple free radical catalysts. While the precise nature of the tactic structure of the polymers has not been elucidated, it is believed that they are syndiotactic rather than isotactic. These monomers are either the o- or p-carboalkoxyphenyl acrylates wherein the alkoxy group is either methoxy or ethoxy.

The novel monomers of the invention may be prepared by reacting acrylyl chloride with the appropriate alkyl hydroxybenzoate (i.e., ortho or para and methyl or ethyl) in the presence of an acid acceptor. The reaction may be carried out in aqueous medium or, if desired, in a solvent medium as acetonitrile. Suitable acid acceptors are sodium hydroxide, sodium carbonate, the corresponding potassium and lithium salts, tertiary amines as pyridine, etc. The temperature of the reaction is not critical and may be from about 0° C. to 50° C. and preferably from 0° C. to 30° C. Generally the use of "stronger" reaction conditions (i.e., stronger bases, higher temperatures, etc.) promotes some hydrolysis of the product decreasing the yield. Normally the reaction is carried out at atmospheric pressure, but where the solvent and/or acid acceptor is too volatile at the desired reaction temperature, the reaction may be carried out at superatmospheric pressure.

The novel monomers may be polymerized or copolymerized in solution, emulsion, non-aqueous dispersion, suspension or bulk.

The polymerization is effected with the aid of a free radical initiator or catalyst, such as an organic or inorganic peroxide, hydroperoxide, azo catalyst, or activating radiation as ultraviolet preferably with an activator. From 0.1% to 3% or more of the initiator or catalyst may be used, based on the total weight of the monomers. To provide a high molecular weight, it is preferred to use from 0.5% to 1% of the initiator. Examples of organic peroxide and hydroperoxide catalysts that may be used include benzoyl peroxide, acetyl peroxide, caproyl peroxide, butyl perbenzoate, p-methane hydroperoxide, cumene hydroperoxide, butyl hydroperoxide. Examples of azo catalysts include azodiisobutyronitrile, azodiisobutyramide, dimethyl or diethyl or dibutyl azodiisobutyrate, azobis(α,γ-dimethylvaleronitrile), azobis(α-methylbutyronitrile), azobis(α-methylvaleronitrile), dimethyl or diethyl azobismethylvalverate, and the like. Inorganic catalysts include the persulfates, percarbonates, perborates, etc.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxidic catalyst is effectively coupled with a reducing agent such as an alkali metal sulfite, bisulfite, or metabisulfite, or hydrosulfite, or hydrazine. The action of the redox system may be controlled through use of a chain transfer agent or regulator, such as dodecyl mercaptan or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble after which the suspension or slurry may be filtered or decanted and the polymer washed. Alternatively, the solvent may be distilled to leave the polymer.

In the case of emulsion polymerization, examples of suitable non-ionic emulsifiers include the higher alkyl phenoxypolyethoxyethanols in which the alkyl group has from 6 to 18 carbon atoms, such as octyl, dodecyl or octadecyl, and there may be from 8 to 50 or more oxyethylene units. Examples of anionic emulsifiers include phosphate surfactants as disclosed in U.S. patent application Ser. No. 255,173 filed Jan. 31, 1963, now U.S. Patent No. 3,235,627, by Mansfield and the higher fatty alcohol sulfates, such as sodium lauryl sulfate; examples of cationic emulsifiers include higher alkyl pyridinium salts such as lauryl pyridinium chloride, (octylbenzyl)trimethylammonium chloride, and so on. For aqueous suspenion polymerization, the conventional suspending agents may be used such as polyvinyl alcohol, hydroxyethyl cellulose, polystyrene sulfonate, insoluble phosphate suspending agents, resentative suspending agents are disclosed, e.g., in U.S. 3,232,903.

The polymers of the invention differ among themselves in their degree of crystallinity and of tacticity. The poly-(p-carbomethoxyphenyl acrylate) is very highly crystalline and almost completel tactic. The poly(p-carboethoxyphenyl acrylate) is highly crystalline and tactic though not quite to the same degree as the methoxy homolog. The corresponding ortho-substituted phenyl acrylate homopolymers are highly ordered and stereo-regular but the crystallization is incomplete.

Like other acrylates the monomers of the invention copolymerize with a wide variety of monomers to form copolymers in which they constitute from 1–99% of the copolymer. In general, monomers copolymerizable with other acrylic monomers, as with methyl acrylate, are copolymerizable with the monomers of the invention. Such monomers include vinyl compounds, acrylates, itaconates, methacrylates, α-olefins as ethylene, etc. The presence of other comonomers reduces the crystallinity of the resulting copolymer. In general, the presence of more than about 10% of such other comonomer (when used in producing a random copolymer) results in a product with little or no crystallinity. This figure of about 10% is very approximate and the precise amount will vary considerably (either above or below 10%) depending on the nature of the monomers. In general as the polymers become less crystalline, as in going from the methoxy to the ethoxy or in going from the para- to the ortho-substituted monomers of the invention or as in adding a comonomer, the melting point of the polymer decreases and the melting point range broadens. While the maximum of crystallinity is desirable for optimum physical properties in the final product, it also makes for the greatest difficulty in handling and processing the polymer. Thus the deliberate introduction of a controlled amount of disorder is often desirable to achieve the best balance between processability and final properties, i.e., for many uses a less-than-perfectly crystalline product may be desired.

While more than about 10% of a comonomer destroys crystallinity in random copolymers, graft, block or layered copolymer may be produced wherein the monomer of the invention constitutes no more than 1% of the total copolymer but wherein the monomer units in the copolymer attributable to the monomer of the invention are crystalline and stereoregular. When used in such polymers the crystalline, tactic component introduced in this way acts to reinforce the copolymer.

The homopolymers of the invention may be spun into fibers or may be extruded to produce sheet or film. The homopolymers and copolymers of the invention, particularly those having an ordered or crystalline structure, may also be used as coatings wherein the crystalline nature of the polymer or copolymer is desirable in providing a gas-proof barrier. Such coatings are particularly desirable for wrapping materials such as cellophane, the high light stability and generally good weathering properties of the polymers of the invention making them particularly desirable in such gas barrier coatings as compared to many of the prior art coatings. The monomers of the invention may be used as a partial or complete replacement for styrene for admixing with unsaturated polyesters such as are in fiberglass construction, potting electrical components, etc. In the production of cast acrylic sheet, it is conventional to produce a saturated solution of poly (methyl methacrylate) in methyl methachylate monomer, optionally with one or more comonomers present, and then cast the solution into a sheet mold and complete the polymerization. The monomers of the invention may be added to the solution along with the additional methyl methacrylate monomer or, if desired, a small amount of one of the polymers of the invention may be dissolved in the monomer solution used in casting the acrylic sheet. The polymer of the invention may also be used as a reinforcing material in producing foams and in particular acrylic foams. These and other uses of the monomers and polymers of the invention will be apparent to those skilled in the art.

In the following examples which are illustrative of the invention, the parts and percentages are by weight unless otherwise indicated.

EXAMPLE 1

A solution of 500 cc. of water, 0.5 mole of sodium hydroxide, 0.5 mole of methyl p-hydroxybenzoate and 0.2% of monomethyl ether of hydroquinone is stirred, keeping the temperature below 30° at all times. To this solution is added 0.5 mole of acrylyl chloride, dropwise so as to keep the temperature below 30°. The solution is then stirred for two hours, neutralized and the precipitated p-carbomethoxyphenyl acrylate filtered off and washed with water.

Recrystallization of the p-carbomethoxyphenyl acrylate from ethanol gives 60% yield, M.P. 80–81° C.

EXAMPLE 2

The process of Example 1 is repeated substituting ethyl hydroxybenzoate for the methyl p-hydroxybenzoate and carrying out the recrystallization in methanol rather than ethanol. Yield is 47% and the product has a melting point of 43–45° C.

EXAMPLE 3

A 300 ml. flask is equipped with a stirrer, thermometer, and an additional funnel, and 100 ml. of acetonitrile, 14.0 g. (0.132 mole) of sodium carbonate, 21.0 g. (0.126 mole) of ethyl salicylate are added. To the stirred mixture is added, dropwise, 12.5 g. (0.138 mole) of acrylyl chloride, while maintaining the temperature below 30°. Upon completion of the addition the reaction mixture is stirred for 3 hours at room temperature, and then poured into 700 ml. of cold water. The organic phase which separates is dissolved in 150 ml. of diethyl ether and washed with water, 10% (aqueous) hydrochloric acid, and water again. The ether phase is then dried over sodium sulfate, the ether evaporated, and the organic material distilled to give 24.0 g. (0.109 mole) of o-carboethoxyphenyl acrylate, B.P. 104°/0.7 mm., $n_D^{20}$ 1.5192 (86%).

EXAMPLE 4

Similarly, using 100 ml. of acetonitrile, 16.0 g. (0.151 mole) of sodium carbonate, 20.0 g. (0.131 mole) of methyl o-carbomethoxyphenyl acrylate is prepared in 74% yield, B.P. 102–104°/0.9 mm., $n_D^{20}$ 1.5271.

EXAMPLE 5

A glass-lined polymerization vessel is vacuum degassed, charged with 8.2242 gms. p-carbomethoxyphenyl acrylate, 31.3372 gms. benzene and 0.0070 gm. azobisisobutyronitrile. The vessel is sealed under vacuum and placed in a water bath maintained at 60° C. for 2 hours. The vessel is then cooled to liquid nitrogen temperature, opened and allowed to warm to room temperature. The contents of the vessel are poured into a ten-fold excess of methanol and the precipitated polymer dried under vacuum at 60° C. for 20 hours. The yield is 3.90 gms. highly crystalline polymer representing a conversion of 47.4%. The second order transition temperature of the polymer is 67° C. The polymer is highly soluble in chloroform. However, after drying not all of the polymer could be redissolved in benzene.

EXAMPLE 6

A glass reaction vessel is vacuum degassed, charged with 8.2204 gms. p-carbomethoxyphenyl acrylate, 60.8312 gms. toluene and 0.0089 gm. benzoin. The vessel is sealed and placed in a bath maintained at 0° C. The vessel is then irradiated with a 100 watt Hanovia UV lamp through a 3600 A. filter for a half-hour. The polymer precipitates during the polymerization. After the half-hour the vessel is opened and the supernatant liquid is poured into an excess of methanol. A small amount of additional polymer precipitates. Both the polymer which precipitated during polymerization and that precipitated from the supernatant liquid by the methanol are easily soluble in chloroform.

EXAMPLE 7

Example 5 is repeated using 1.8416 gms. p-carbomethoxyphenyl acrylate, 9.8285 gms. benzene and 0.0006 gm. azobisisobutyronitrile excepting that the time of polymerization is 21 hrs. The polymer is produced at a conversion of 76.1%. Despite the high conversion, the polymer dissolves readily in chloroform. Fibers are pulled from a molten polymer sample, stretched and annealed. X-ray diagrams of these oriented fibers clearly show crystallinity (orthorhombic lattice) and orientation. A total of eight zero-layer and two first-layer reflections are observed.

EXAMPLE 8

The polymerization is carried out as in Example 5 except that the charge is 2.1309 gms. of p-carbomethoxyphenyl acrylate, 8.1197 gms. p-cyanophenyl acrylate, 39.9961 gms. acetone and 0.0083 gm. azobisisobutyronitrile and the polymerization time is 3.5 hours. The conversion is 66.3%. Upon analysis it is found that the ratio of monomers in the copolymer is 0.2353. This compares with a ratio of 0.2196 in the initial charge.

Under similar conditions, copolymers of 48.83% p-carbomethoxyphenyl acrylate and 78.74% p-carbomethoxyphenyl acrylate are prepared with p-cyanophenyl acrylate.

EXAMPLE 9

The polymerization of p-carboethoxyphenyl acrylate is carried as in Example 8 except the concentration of monomer in acetone is 16% and the conversion is 74%. X-ray diagrams of oriented fibers prepared from the melt clearly show crystallinity (orthorhombic lattice) and orientation, although not quite to the same degree as in the case of poly (p-carbomethoxyphenyl acrylate). A total of seven zero-layer reflections are observed.

X-ray diagrams of poly (o-carbomethoxyphenyl acrylate) and poly (o-carboethoxyphenyl acrylate) show the polymers to be highly ordered and steroregular. However, crystallization is rather incomplete.

EXAMPLE 10

An ampoule containing 0.0029 g. of azobisisobutyronitrile and 15.3 g. of o-carbomethoxyphenyl acrylate is degassed six times under vacuum and heated to 60° C. After 30 minutes the ampoule is cooled and opened, and benzene added to dissolve the polymer. The polymer is precipitated from petroleum ether and dried at 50° C. in a vacuum oven for six hours to give 9.2 g. of polymer. The conversion is 60%.

EXAMPLE 11

A similar procedure using 0.0032 g. of azobisisobutyronitrile and 16.7 g. of o-carboethoxyphenyl acrylate yields 3.6 g. of polymer. The conversion is 22%.

EXAMPLE 12

A 50 cc. round bottom flask is charged with 16 cc. deionized water, 0.16 g. sodium lauryl sulfate and 8 g. p-carbomethoxyphenyl acrylate. The flask is heated to 75° C. under nitrogen and 0.8 cc. of 1% aqueous potassium persulfate are added. Polymerization is conducted for 5 hours. The polymer isolated by evaporating a portion of the emulsion is highly crystalline and has a melting point of 200° to 204° C.

A copolymer prepared by the emulsion copolymerization of 55 parts p-carbomethoxyphenyl acrylate and 45 parts p-carboethoxyacrylate (85% conversion in two hours using potassium persulfate initiator) had a minimum film-forming temperature of 0° C.

What is claimed is:
1. A compound adapted to form crystalline vinyl addition polymers, selected from the class consisting of p-carbomethoxyphenyl acrylate, p-carboethoxyphenyl acrylate, o-carbomethoxyphenyl acrylate, and a carboethoxyphenyl acrylate.
2. A monomer adapted to form crystalline vinyl addition polymers, which is p-carbomethoxyphenyl acrylate.
3. A monomer adapted to form crystalline vinyl addition polymers, which is p-carboethoxyphenyl acrylate.
4. A monomer adapted to form crytalline vinyl addition polymers, which is o-carbomethoxyphenyl acrylate.
5. A monomer adapted to form crystalline vinyl addition polymers, which is o-carboethoxyphenyl acrylate.
6. A crystalline vinyl addition polymer selected from the class consisting of poly(p-carbomethoxyphenyl acrylate), poly(p-carboethoxyphenyl acrylate), poly(o-carbomethoxyphenyl acrylate), and poly(o-carboethoxyphenyl acrylate).
7. A crystalline vinyl addition polymer which is poly (p-carbomethoxyphenyl acrylate).
8. A crystalline vinyl addition polymer which is poly (p-carboethoxyphenyl acrylate).
9. A crystalline vinyl addition polymer which is poly (o-carbomethoxyphenyl acrylate).
10. A crystalline vinyl addition polymer which is poly (o-carboethoxyphenyl acrylate).
11. A copolymer of about 1 to 99 molar parts of at least one acrylic monomer selected from the class consisting of p-carbomethoxyphenyl acrylate, p-carboethoxyphenyl acrylate, o - carbomethoxyphenyl acrylate, and o-carboethoxyphenyl acrylate, and, correspondingly, from 99 to 1 molar parts of at least one copolymerizable monomer, wherein groups of adjacent monomer units contributed by said acrylic monomer provide crystalline and stereoregular portions in such copolymer molecules.
12. A vinyl addition polymer of a compound selected from the class consisting of p-carbomethoxyphenyl acrylate, p-carboethoxyphenyl acrylate, o-carbomethoxyphenyl acrylate, and o-carboethoxyphenyl acrylate, wherein groups of adjacent monomer units contributed by said acrylic monomer provide crystalline and stereoregular portions in such copolymer molecules.
13. A copolymer according to claim 11 wherein said acrylic monomer comprises from about 10 to 99 molar parts of said copolymer and correspondingly, from about 90 to 1 molar parts of said copolymerizable monomer.

References Cited

UNITED STATES PATENTS 2,833,825   5/1958   Lewis _____ 260—476
3,103,503   9/1963   Fox et al.
3,113,907   12/1963  Tocker _____ 260—86.1

HARRY WONG, JR., Primary Examiner

U.S. Cl. X.R.

260—33.6, 33.8, 78.5, 86.1, 86.7, 476, 860, 885